United States Patent Office 2,901,453
Patented Aug. 25, 1959

2,901,453
AQUEOUS COMPOSITION COMPRISING AMMONIUM SALT OF MALEAMIC ACID/DIISOBUTYLENE COPOLYMER AND LINEAR ADDITION POLYMER AND ARTICLE COATED THEREWITH

Arthur D. Jordan, Jr., Moorestown, N.J., assignor to Rohm & Haas Company, Philadelphia, Pa., a corporation of Delaware No Drawing. Application January 14, 1957
Serial No. 633,840

11 Claims. (Cl. 260—29.6)

This invention relates to aqueous coating compositions adapted to produce in improved manner clear glossy coatings substantially free of blocking tendencies even under severe temperature and humidity conditions. It is particularly concerned with the preparation of such coating compositions as are especially useful for the production of clear glossy non-blocking coatings on fibrous bases or substrates such as paper, paperboard, or the like.

This application is a continuation-in-part of my copending application Serial No. 567,419, filed February 23, 1956, now abandoned.

Heretofore aqueous solutions of thermosetting aminoplast condensates have been applied for the production of clear glossy coatings, such as on paper, but such compositions require the use of substantial amounts of catalyst, generally of acidic character, and require the use of extremely high curing temperatures in order to convert the condensate to insoluble condition in which it is free of blocking. Coatings have been applied to paper by means of water-insoluble linear addition polymers which require no use of an acidic catalyst for converting them to insoluble form. If such polymers are of hard character, that is sufficiently hard to avoid severe blocking, they must be applied from organic solvent solutions or application of aqueous dispersions thereof must be accompanied by the use of extremely high temperatures in order to effect coalescence into a continuous film. On the other hand, when relatively soft addition polymers of water-insoluble character are applied from aqueous dispersions so that normal or only moderately elevated temperatures are required to effect coalescence of the polymer, a coating is deposited which has pronounced tendency to block under even the mildest conditions of temperature and humidity. It has been suggested heretofore to overcome the disadvantage of the soft polymers by including substantial proportions of fillers or pigments within the aqueous dispersion. This expedient reduces the tendency of the coating to block but cannot be resorted to when it is desired to produce clear glossy coatings. In accordance with the invention disclosed in U.S. Patent 2,757,106, a practical way of overcoming this tendency of the softer polymers to block is accomplished by introducing into the polymer molecule a small proportion of carboxylic groups and by also introducing into the aqueous dispersion before deposition of the coating a polyvalent metal compound, such as basic aluminum acetate, calcium hydroxide, or the like, so that, on drying, the polyvalent metal salt cross-links the polymer molecules and thereby renders the coating resistant to blocking. This procedure requires the modification of the copolymer by the introduction of carboxylic acid groups.

In accordance with the present invention, it has been found that non-blocking coatings can be obtained from aqueous dispersions of water-insoluble addition polymers having sufficient softness to adapt them to coalesce on deposition at normal room temperatures or at moderately elevated temperatures without the need to introduce carboxyl groups or any other hydrophilic groups into the copolymer. The coating compositions of the present invention do not require high temperatures during the deposition or drying stages, and there is no need of a curing catalyst or a baking operation.

In order to accomplish these objectives, there is provided in accordance with the present invention an aqueous coating composition in the form of an aqueous dispersion of (a) a water-insoluble linear addition polymer having a $T_i$ as defined hereinbelow of not above 30° C., such as from about −45° C. to +30° C. and (b) certain salts of a linear copolymer from maleic anhydride and diisobutylene of the formula $$H_3CC(CH_3)_2CH_2C(CH_3)=CH_2$$

combined in approximately 1:1 molar ratio and the copolymer having an average molecular weight from about 500 to 5000.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm$^2$.

The salt of the latter copolymer (component b) may be either a simple ammonium salt or a complex zinc ammonium salt. Since neutralization (at room temperature up to 50° C. or even up to about 70° C.) of the maleic anhydride copolymers with ammonia produces both ammonium salt groups and amide groups in proportions corresponding substantially to the proportions in which such groups are present in the half salt of the half amide of the copolymer, the salt of the present invention may be herein designated as an ammonium salt, whether simple or of the zinc complex type of a maleamic acid-diisobutylene copolymer even though the proportion of the amide groups varies more or less from the strict amount that would theoretically be present if all of the units in the polymer derived from maleic anhydride were converted to monoamide units. Reference herein to the ammonium salt of the copolymer of maleic anhydride is intended to include the salt of the half amide or maleamic acid polymer which is actually formed.

The copolymers may be produced by conventional procedures such as by copolymerization in an organic solvent, such as xylene or dioxane, in the presence of an initiator, such as benzoyl peroxide, lauroyl peroxide, cumene hydroperoxide, t-butyl perbenzoate, or the like. The usual procedures for isolating the copolymer may be employed, such as removal of solvent and monomer by distillation or separation of the copolymer, when precipitated, by filtration. If desired, copolymers of substantial homogeneity may be obtained for use in the present invention either by controlling polymerization conditions or by suitable fractionation of a heterogeneous polymer obtained.

The complex zinc ammonium salt may be prepared by adding ammonium hydroxide to a solution of zinc acetate or other water-soluble zinc salt, thereby initially precipitating zinc hydroxide, which is redissolved by the addition of more ammonium hydroxide, thereby producing a solution of the zinc ammonium acetate or other complex zinc ammonium salt which is then added to the aqueous dispersion of the maleic copolymer in the form of its ammonium salt. The complex zinc ammonium salt of the copolymer has the advantage that it produces a final coating having even greater resistance to water than coatings formed from the simple ammonium or amine salts thereof. The latter coatings, however, have good water-resistance which is adequate for most purposes. Generally, the simple ammonium copolymer salts are preferred because of their inexpensiveness. Finely divided zinc oxide of 1 to 100 micron size, preferably of pigment grade, such as not over 45 to 50 micron size, may be suspended in the aqueous dispersions of the two polymers (components $a$ and $b$), especially when the simple ammonium salt of component $b$ is used. It serves to cross-link the carboxyl-containing polymers on drying, during which the ammonia is apparently replaced by the zinc ion. The amount of zinc oxide may be from about 5 to 20%, and is preferably about 10% on the weight of the total polymer solids ($a$) and ($b$).

The proportions of the copolymer salt (component $b$) and the other polymer (component $a$) may generally be from 10 to 35 parts of the former to 90 to 65 parts of the latter, depending upon the particular components mixed. Preferably, from 70 to 85 parts of ($a$) are mixed with 30 to 15 parts respectively of ($b$).

The first-mentioned polymer (component $a$) may contain a small proportion of hydrophilic groups up to about 2.5% by weight thereof in the polymer molecule, but it is preferred that the copolymer consist entirely of hydrophobic polymer units. The aqueous dispersion of this water-insoluble linear addition polymer may be formed by conventional emulsion polymerization or copolymerization procedures from a single monomer or from a mixture of monomers which form homopolymers or copolymers having a $T_i$ which is not above 30° C. Monomers which form sufficiently soft homopolymers include the acrylates of primary and secondary alcohols, such as those having from 1 to 18 carbon atoms. Other monomers which form sufficiently soft homopolymers include the methacrylates of alcohols having 5 to 18 carbon atoms. Homopolymers of any of these monomers or copolymers of a mixture of two or more of these monomers may be employed for the purpose of producing water-insoluble linear addition polymers for the aqueous coating compositions of the present invention. Preferably, however, the methyl, ethyl, propyl, or butyl acrylates are employed. Any of these monomers which form soft polymers may be copolymerized with such hardening comonomers as the lower alkyl methacrylates in which the alkyl group may have from 1 to 4 carbons, namely the methyl, ethyl, propyl, and butyl methacrylates, styrene, acrylonitrile, methacrylonitrile, vinyl acetate, vinyl chloride, vinylidene chloride, and the like. The amount of hard comonomer that may be copolymerized with one of the soft monomers above depends upon the particular hard and soft comonomers to be copolymerized. The following list gives, for several typical copolymer systems, approximately the maximum amount of a particular hard comonomer that may be used with a particular soft comonomer to provide copolymers which have $T_i$ values of about 10° C. and lower. They are accordingly within the preferred range cited above and considerably more of the hard comonomer could be used to provide copolymers which are still within the maximum scope of the invention as defined by the upper $T_i$ limit of 30° C. For example, a copolymer of 64% by weight of ethyl acrylate and 36% of methyl methacrylate has a $T_i$ value of about 20° C.:

Methyl acrylate 75, ethyl acrylate 25,
Ethyl acrylate 76, methyl methacrylate 24,
Ethyl acrylate 78, styrene 22,
Ethyl acrylate 78, acrylonitrile 22,
Ethyl acrylate 20, butyl methacrylate 80,
n-Propyl acrylate 62, methyl methacrylate 38,
n-Propyl acrylate 72, acrylonitrile 28,
Butyl acrylate 58, methyl methacrylate 42,
Butyl acrylate 68, acrylonitrile 32,
Butyl acrylate 10, butyl methacrylate 90,
Butyl acrylate 57, styrene 43.

Copolymers of 35% to 65% by weight of butadiene with 65% to 35% respectively by weight of acrylonitrile or styrene are also useful copolymers having $T_i$ values below 30° C.

The emulsifiers or dispersing agents that may be used for preparing the monomeric emulsions before polymerization or dispersions of the polymer after polymerization may be anionic or non-ionic or a mixture of non-ionic type with an agent of anionic type. The amount of emulsifier or dispersing agent may depend upon the particular monomeric system, but in general is from ½% to 3% by weight of the monomers employed.

Suitable anionic dispersing agents include the higher fatty alcohol sulfates, such as sodium lauryl sulfate, alkylaryl sulfonates, e.g. sodium or potassium isopropylbenzene sulfonates or isopropyl naphthalene sulfonates, alkali metal higher alkali sulfosuccinates, e.g. sodium octyl sulfosuccinate, sodium N-methyl-N-palmitoyltaurate, sodium oleyl isothionate, alkali metal salts of alkylarylpolyethoxyethanol sufonates or sufonates, e.g. sodium t-octylphenoxypolyethoxyethyl sulfate having 1 to 5 oxyethylene units.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

Instead of using one of the anionic or non-ionic emulsifiers mentioned, the maleic anhydride copolymer salt (component $b$) may be employed as the emulsifier for the monomers in the emulsion copolymerization to form the aqueous dispersion of the water-insoluble copolymer (component $a$), or it may be used as a dispersing agent for dispersing a finely divided polymer or copolymer (component $a$) to form the aqueous dispersion thereof.

If the maleamic acid copolymer salt is used as the emulsifying or dispersing agent in the preparation of the aqueous dispersion of component $a$, the amount used may be just sufficient to effect the emulsifying or dispersing actions required, in which event additional copolymer salt (component $b$) is added later to provide the proper relative proportions between components $a$ and $b$ as defined hereinabove. On the other hand, the full amount of the copolymer salt needed to form the proper proportion thereof in the final aqueous dispersion may be initially introduced to serve as the emulsifying or dispersing agent.

When the aqueous dispersion of the water-insoluble linear addition polymer (component $a$) is formed by means of one of the other emulsifying agents, it is merely necessary to add to the aqueous dispersion of component $a$, thereby obtained, the proper proportion of the maleic anhydride copolymer salt. The product is an essentially stable dispersion which is relatively non-corrosive since it contains no strongly acid material, such as an acidic catalyst, commonly used in thermosetting aminoplast compositions. The concentration may be from 5 to 70% total solids.

The composition may be applied to the substrate to be coated in any suitable manner, such as by a knife coater or by dipping, roller-coating, spraying, brushing, or the like. After application, it is merely necessary to pass the coated substrate, such as the paper, through the normal drying equipment. The dispersed polymeric materials coalesce during the drying to form a clear continuous film, which is highly glossy and resistant to water, to grease, and to blocking. The coating on the substrate obtained from the composition is essentially a mixture of the several components described hereinabove except that the maleic anhydride copolymer salt is substantially converted into free acid and/or amide and/or imide form as the result of the volatilization of ammonia. In the case of the complex zinc ammonium salt, the final copolymer remains as an insoluble zinc salt thereof. The use of zinc oxide also produces an insoluble cross-linked zinc salt of the maleic acid copolymer. If desired, a top-coating may be applied from an aqueous dispersion containing alum and one of the salts of the maleic anhydride-olefin copolymers mentioned hereinabove.

The use of zinc oxide has the remarkable characteristic of increasing the temperature at which blocking occurs to a point above the charring temperature of paper which occurs at about 180° C. In this system, also, the coating becomes completely integral in the sense that the usual solvents that remove the emulsifiers used in making the emulsion copolymers (component $a$) from coatings obtained therefrom in normal fashion and even from the other systems of the present invention show little or no removal of such emulsifiers from the "integral" coatings made with the systems of the present invention using zinc oxide in the proportions above. The coatings obtained with zinc oxide are especially valuable because of their high block-resistance and resistance to solvents and plasticizers. They are, accordingly, useful as film- and sheet-casting bases. Thus paper or other substrate carrying such a coating can be formed in a continuous band and a film-forming solution or dispersion in organic solvents or plasticizers of a vinyl or acrylic polymer may be applied to the coated face of the base, dried, and fused at elevated temperatures, such as up to 180° C. or more. The cooled casting can then be stripped and a glossy face is obtained on the side of the cast film or sheet which had previously been in contact with the casting support. Previously used organosol-release coatings for paper and like bases have generally produced dull surfaces on the face of the cast film which had been in contact with the release coating or they have had the disadvantage of being water-sensitive or water-soluble. The coatings of the present invention are insensitive to moisture and grease-resistant.

The fibrous substrates to which the compositions are applied in carrying out the present invention include papers of all types, such as bond writing paper, fibrous paperboards such as cardboard, chipboard, carton stock, and the like, wrapping papers or boards, or liners for containers intended for the packaging of foods, greases, chewing gum, soap, soap powders, cosmetics, calking compounds, etc. The coated papers may also be used as wall papers, papers for lining drawers and shelves, especially in linen closets, kitchen cabinets and so forth, and the coated paper or paperboards may be used as bookcovers or book pages. An amazing discovery is that the aqueous coating composition can be applied directly over hydrophobic inks, such as may be on decorated or printed papers or cardboards, particularly such as are used for postcards, book or magazine covers, advertising posters, wall papers, shelf papers and the like, without being repelled thereby and without smudging or showing any evidence of attack upon the printing or decorative matter. The composition may be applied to photographs or photostats to provide a clear glossy protective coating which is still highly receptive to printing and substantially stable to ultraviolet light. The coatings may be applied to building construction papers and boards, such as the facing paper on plasterboard. It may be used as a release coating on a paper to be used as a liner in a concrete molding form or adapted to be used for covering freshly-laid concrete roads.

For many of these purposes, the non-blocking and mar-resistant characteristics of the coated products are quite important. An important advantage is also the fact that no high temperatures are required, nor is any acid catalyst required to convert the coated films into water-insoluble or non-blocking coatings. The use of the aqueous dispersions also avoids the danger of fire and the toxic effects on operators. It requires no equipment for solvent recovery.

In the following examples, which are illustrative of the present invention, the parts given are by weight unless otherwise indicated. The heat-seal temperature referred to is the temperature at which two coated sheets first begin to show traces of sticking together sufficiently to mar the coating upon separation of the sheets.

*Example 1*

An aqueous dispersion is prepared containing 100 parts of a copolymer of about 66% by weight of ethyl acrylate with 34% by weight of methyl methacrylate and 40 parts of the ammonium salt, formed by neutralization at room temperature to about 50° C. with ammonium hydroxide, of a copolymer of maleic anhydride with diisobutylene in 1:1 mole ratio. A chipboard coated with the composition and dried showed no blocking at 140° F. and 75% relative humidity when a plurality of the coated boards were stacked upon one another under a weight of 2¾ lbs./sq.in. The coated board showed a heat-seal temperature of 360° F. Coatings obtained in the same way from the ethyl acrylate/methyl methacrylate copolymer but without the ammonium copolymer salt exhibited severe blocking under the above conditions and showed a heat-seal temperature of about 140° F.

*Example 2*

A coating composition consisting of an aqueous dispersion of 100 parts of a copolymer of 75% of vinyl acetate with 15% of methyl acrylate and 10% of ethyl acrylate and 40 parts of the ammonium salt, formed by neutralization at room temperature to about 50° C. with ammonium hydroxide, of a 1:1 mole ratio of maleic anhydride—diisobutylene copolymer is applied to chipboard and dried. A clear glossy coating is obtained showing no evidence of blocking at 140° F. and 75% relative humidity under a pressure of 2¾ lbs./sq.in. The coating showed a heat-seal temperature of 300° F. Coated chipboard obtained from aqueous dispersions of the vinyl acetate copolymer without the ammonium salt exhibited severe blocking at the conditions mentioned and had a heat-seal temperature below 180° F.

*Example 3*

An aqueous coating composition comprising an aqueous dispersion of 100 parts of a copolymer of 60% of butadiene with 40% of styrene and 40 parts of the ammonium salt, formed by neutralization at room temperature to about 50° C. with ammonium hydroxide, of a 1:1 mole ratio maleic anhydride/diisobutylene copolymer is coated on chipboard and dried. The coatings show no blocking at 140° F. and 75% relative humidity and under 2¾ lbs./sq.in. weight. They exhibit a heat-seal temperature of 360° F. Coated chipboard on which the coating consists of the butadiene/styrene copolymer without the ammonium copolymer salt show 100% blocking under the conditions mentioned and exhibit a heat-seal temperature of less than 180° F.

Example 4

(a) Several pieces of chipboard are coated with an aqueous dispersion containing 100 parts of a copolymer of about 65% ethyl acrylate, about 33½% methyl methacrylate and about 1½% methacrylic acid and 10 parts of the complex zinc ammonium salt of a 1:1 mole ratio copolymer of maleic anhydride with diisobutylene, formed by first neutralizing the copolymer with ammonium hydroxide and then treating the salt thus obtained with an aqueous solution of zinc ammonium acetate. The coating shows only slight traces of blocking at 140° F. and 75% relative humidity under a load of 2¾ lbs. The coating also has a heat-seal temperature of 240° F. Coatings formed from the ternary copolymer alone without the zinc ammonium copolymer salt show severe blocking under the conditions above and heat-seal at a temperature of 140° F.

(b) Repetition of the coating procedure of part a hereof by increasing the zinc ammonium copolymer salt to 20 parts eliminates the blocking under the conditions specified and raises the heat-seal temperature to 300° F.

(c) Repetition of the coating procedure of part a by increasing the amount of zinc ammonium copolymer salt to 40 parts provides coatings which are free of blocking even at 170° F. and 75% relative humidity under a load of 2¾ lb./sq.in. and raises the heat-seal temperature to above 360° F.

Example 5

(a) An aqueous dispersion is prepared containing 100 parts of the ammonium salt of a copolymer of about 87% ethyl acrylate, 10.5% methyl methacrylate, and 2.5% itaconic acid in 116 parts of water; 28 parts of zinc oxide (passing a 325 mesh screen) are dispersed in 28 parts of water with 0.06 part of t-octylphenoxypolyethoxyethanol containing about 12 oxyethylene units, and 0.2 part of the ammonium salt of the approximately 1:1 mole ratio copolymer of maleamic acid/diisobutylene co-polymer. The zinc oxide dispersion is mixed into the copolymer dispersion with agitation. Then a solution in 142 parts of water of 40 parts of the ammonium salt of the approximately 1:1 mole ratio copolymer of maleamic acid/diisobutylene copolymer is mixed with agitation into the zinc oxide/copolymer dispersion. A chipboard coated with the composition and dried showed no blocking at 180° F. and 100% relative humidity when a plurality of the coated boards were stacked upon one another under a weight of 2¾ lbs./sq.in. The coated board showed a heat-seal temperature of above 400° F.

(b) An organosol composed of:

100 parts of polyvinyl chloride,
30 parts of dioctyl phthalate,
30 parts epoxidized soybean oil,
20 parts xylene, and
10 parts of methyl ethyl ketone is cast on the coated face of the coated paper of part a. It is dried by heating at 140° F. about ten minutes, and then heating at 350° F. about ten minutes to dry and fuse the vinyl resin. It is cooled and stripped. The stripped film is tough, coherent, and glossy on both faces.

(c) A 15% solution of a copolymer of 85% vinyl chloride and 15% vinyl acetate is spread over the coated surface of the paper prepared in part a hereof. The cast film is dried ten minutes at 140° F., ten minutes at 220° F. and cooled. On stripping, the self-supporting film obtained is glossy on both faces.

It is to be understood that changes and variations may be made without departing from the spirit and scope of the invention as defined in the appended claims.

I claim:

1. An aqueous composition comprising (1) an ammonium salt of an approximately 1:1 mole ratio copolymer of maleamic acid and diisobutylene, said salt having an average molecular weight of about 500 to 5000, and (2) a water-insoluble linear addition polymer of polymerizable monomeric molecules selected from the group consisting of acrylic acid esters of primary and secondary alkanols having 1 to 18 carbon atoms, methacrylic acid esters of alkanols having 5 to 18 carbon atoms, mixtures thereof with each other, and mixtures of at least one of these esters with molecules of at least one hardening comonomer selected from the group consisting of the lower alkyl methacrylates in which the alkyl group has 1 to 4 carbon atoms, styrene, acrylonitrile, methacrylonitrile, vinyl acetate, vinyl chloride and vinylidene chloride, the addition polymer having a modulus of rigidity transition temperature value in the range of —45° C. to 30° C. determined at 300 kg./cm.$^2$ and the proportions between (1) and (2) being from 10 to 35 parts by weight of the former to 90 to 65 parts of the latter.

2. An aqueous composition comprising (1) an ammonium salt of an approximately 1:1 mole ratio copolymer of maleamic acid and diisobutylene, said salt having an average molecular weight of about 500 to 5000, and (2) a water-insoluble linear copolymer of vinyl acetate and methyl acrylate having a modulus of rigidity transition temperature value in the range of —45° C. to 30° C. determined at 300 kg./cm.$^2$, the proportions between (1) and (2) being from 10 to 35 parts by weight of the former to 90 to 65 parts of the latter.

3. An aqueous composition comprising (1) an ammonium salt of an approximately 1:1 mole ratio copolymer of maleamic acid and diisobutylene, said salt having an average molecular weight of about 500 to 5000, and (2) a water-insoluble linear copolymer of vinyl acetate and ethyl acrylate having a modulus of rigidity transition temperature value in the range of —45° C. to 30° C. determined at 300 kg./cm.$^2$, the proportions between (1) and (2) being from 10 to 35 parts by weight of the former to 90 to 65 parts of the latter.

4. An aqueous composition comprising (1) an ammonium salt of an approximately 1:1 mole ratio copolymer of maleamic acid and diisobutylene, said salt having an average molecular weight of about 500 to 5000, and (2) a water-insoluble linear copolymer of vinyl acetate, ethyl acrylate, and methyl acrylate having a modulus of rigidity transition temperature value in the range of —45° C. to 30° C. determined at 300 kg./cm.$^2$, the proportions between (1) and (2) being from 10 to 35 parts by weight of the former to 90 to 65 parts of the latter.

5. An aqueous composition comprising (1) an ammonium salt of an approximately 1:1 mole ratio copolymer of maleamic acid and diisobutylene, said salt having an average molecular weight of about 500 to 5000, and (2) a water-insoluble linear copolymer of ethyl acrylate and methyl methacrylate having a modulus of rigidity transition temperature value in the range of —45° C. to 30° C. determined at 300 kg./cm.$^2$, the proportions between (1) and (2) being from 10 to 35 parts by weight of the former to 90 to 65 parts of the latter.

6. A composition as defined in claim 5 in which the ammonium salt is a complex zinc ammonium salt.

7. A composition as defined in claim 5 in which the salt is a simple ammonium salt.

8. A coating composition comprising an aqueous dispersion containing dispersed therein a film-forming material consisting exclusively of a mixture of (1) an ammonium salt of an approximately 1:1 mole ratio copolymer of maleamic acid and diisobutylene, said salt having an average molecular weight of about 500 to 5000, and (2) a water-insoluble linear addition polymer of polymerizable monomeric molecules selected from the group consisting of acrylic acid esters of primary and secondary alkanols having 1 to 18 carbon atoms, methacrylic acid esters of alkanols having 5 to 18 carbon atoms, mixtures thereof with each other, and mixtures of at least one of these esters with molecules of at least one hardening comonomer selected from the group consisting of the lower alkyl methacrylates in which the alkyl group has 1 to 4 carbon atoms, styrene, acrylonitrile, methacrylonitrile, vinyl acetate, vinyl chloride and vinylidene chloride, the addition polymer having a modulus of rigidity transition temperature value in the range of —45° C. to 30° C. determined at 300 kg./cm.$^2$ and the proportions between (1) and (2) being from 10 to 35 parts by weight of the former to 90 to 65 parts of the latter.

9. As an article of manufacture, a fibrous substrate having on at least one surface thereof a clear, glossy block-resistant deposit of a mixture of (1) an ammonium salt of an approximately 1:1 mole ratio copolymer of maleamic acid and diisobutylene, said salt having an average molecular weight of about 500 to 5000, (2) a water-insoluble linear addition polymer of polymerizable monomeric molecules selected from the group consisting of acrylic acid esters of primary and secondary alkanols having 1 to 18 carbon atoms, methacrylic acid esters of alkanols having 5 to 18 carbon atoms, mixtures thereof with each other, and mixtures of at least one of these esters with molecules of at least one hardening comonomer selected from the group consisting of the lower alkyl methacrylates in which the alkyl group has 1 to 4 carbon atoms, styrene, acrylonitrile, methacrylonitrile, vinyl acetate, vinyl chloride and vinylidene chloride, the addition polymer having a modulus of rigidity transition temperature value in the range of —45° C. to 30° C. determined at 300 kg./cm.$^2$ and the proportions between (1) and (2) being from 10 to 35 parts by weight of the former to 90 to 65 parts of the latter, and (3) finely divided zinc oxide suspended therein in an amount of 5 to 20% by weight of the total polymer solids of (1) and (2).

10. An article as defined in claim 9 in which the substrate is a paper.

11. An aqueous composition comprising (1) an ammonium salt of an approximately 1:1 mole ratio coplymer of maleamic acid and diisobutylene, said salt having an average molecular weight of about 500 to 5000, (2) a water-insoluble linear addition polymer of polymerizable monomeric molecules selected from the group consisting of acrylic acid esters of primary and secondary alkanols having 1 to 18 carbon atoms, methacrylic acid esters of alkanols having 5 to 18 carbon atoms, mixtures thereof with each other, and mixtures of at least one of these esters with molecules of at least one hardening comonomer selected from the group consisting of the lower alkyl methacrylates in which the alkyl group has 1 to 4 carbon atoms, styrene, acrylonitrile, methacrylonitrile, vinyl acetate, vinyl chloride and vinylidene chloride, the addition polymer having a modulus of rigidity transition temperature value in the range of —45° C. to 30° C. determined at 300 kg./cm.$^2$ and the proportions between (1) and (2) being from 10 to 35 parts by weight of the former to 90 to 65 parts of the latter, and (3) finely divided zinc oxide suspended therein in an amount of 5 to 20% by weight of the total polymer solids of (1) and (2).

References Cited in the file of this patent
UNITED STATES PATENTS

| | | |
|---|---|---|
| 2,486,258 | Chavannes | Oct. 25, 1949 |
| 2,490,677 | Cupery | Dec. 6, 1949 |
| 2,597,087 | Cowgill | May 20, 1952 |
| 2,607,752 | Crouch et al. | Aug. 19, 1952 |
| 2,612,485 | Baer et al. | Sept. 30, 1952 |
| 2,616,818 | Azorlosa | Nov. 4, 1952 |
| 2,707,805 | Smith | May 10, 1955 |
| 2,725,367 | Niederhauses | Nov. 29, 1955 |